United States Patent [19]

Sawano et al.

[11] Patent Number: 4,671,579
[45] Date of Patent: Jun. 9, 1987

[54] ANTI-SKID CONTROL DEVICE FOR VEHICLE BRAKING APPARATUS

[75] Inventors: Susumu Sawano, Tokyo; Masaru Sakuma, Kawasaki, both of Japan

[73] Assignee: Tokico Ltd., Kawasaki, Japan

[21] Appl. No.: 843,601

[22] Filed: Mar. 25, 1986

[30] Foreign Application Priority Data

Apr. 2, 1985 [JP] Japan ................................. 60-69285

[51] Int. Cl.$^4$ ................................................ B60T 8/02
[52] U.S. Cl. .......................... 303/95; 303/20; 303/97; 303/99; 303/106; 303/108; 364/426
[58] Field of Search ............... 364/426; 303/20, 91, 303/93, 94–99, 100, 102–111, 68, 61; 188/181

[56] References Cited

U.S. PATENT DOCUMENTS

| | | | |
|---|---|---|---|
| 3,861,756 | 1/1975 | Arikawa | 303/106 |
| 3,874,741 | 4/1975 | Schnaibel et al. | 188/181 A X |
| 4,353,601 | 10/1982 | Jones | 303/106 |
| 4,446,522 | 5/1984 | Sato et al. | 303/106 X |
| 4,485,445 | 11/1984 | Braschel | 303/95 X |
| 4,517,647 | 5/1985 | Harada et al. | 303/95 X |
| 4,562,542 | 12/1985 | Skarvada | 364/426 |

FOREIGN PATENT DOCUMENTS

| | | |
|---|---|---|
| 50-236 | 1/1975 | Japan . |
| 57-70758 | 5/1982 | Japan . |
| 58-194647 | 11/1983 | Japan . |
| 59-50841 | 3/1984 | Japan . |

*Primary Examiner*—Douglas C. Butler
*Attorney, Agent, or Firm*—Oblon, Fisher, Spivak, McClelland & Maier

[57] ABSTRACT

An anti-skid control device comprising a detector for detecting a wheel circumferential velocity, an electromagnetic valve for controlling a hydraulic braking pressure for a wheel and an electronic control circuit for preparing an aimed wheel circumferential velocity based on a detection signal from the detector during a time of braking and controlling the electromagnetic valve so as to bring the wheel circumferential velocity closer to said aimed wheel circumferential velocity.

4 Claims, 7 Drawing Figures

ANTI-SKID CONTROL DEVICE FOR VEHICLE BRAKING APPARATUS

This invention concerns an anti-skid control device for use in vehicle braking apparatus.

It has been known that the slip ratio S is defined as:

$$S = \frac{V - V_w}{V}$$

where V represents a vehicle velocity and Vw represents wheel circumferential velocity, as well as that there is a relationship between the slip ratio S and the friction coefficient $\mu$ approximately as shown in FIG. 1, in which $\mu$ represents a friction coefficient between wheels and a road surface in contact therewith along the running direction. In FIG. 1, the values for $\mu$ and $\mu_L$ taken on the ordinate are normalized referring to the maximum value as 1. In FIG. 1, curve a represents a relationship between the slip ratio S and the friction coefficient $\mu$ at a road surface of a high friction coefficient such as a dry concrete road surface along the running direction of a vehicle, curve b shows a relationship between the slip ratio S and the friction coefficient $\mu$ at a road surface of a low friction coefficient liable to cause slipping such as a snow-covered road surface along the running direction of a vehicle and curve c represents a relationship between the slip ratio S and the friction coefficient $\mu_L$ in the lateral direction of the wheels, that is, in the direction perpendicular to the running direction thereof. As is apparent from FIG. 1, the friction coefficient $\mu$ is generally maximized near the value of slip ratio S=0.2, and is decreased as the slip ratio S increases, in a case where the slip ratio is more than 0.2, for example, in a case where a rapid braking is applied to the vehicle wheels so as to stop rotation of the wheels and lock the wheels, whereas the lateral friction coefficient $\mu_L$ is abruptly decreased along with the increase in the slip ratio S. Accordingly, in order to supply the braking force to the wheels so as to stop the vehicle within the least distance, it is preferred that braking force is applied to the wheels such that the friction coefficient $\mu$ may always be kept near the maximum value, that is, the slip ratio S is maintained near 0.2 during braking. Further, in the case where the braking is applied such that the friction coefficient $\mu$ near the maximum value may be obtained as mentioned above, since the lateral friction coefficient $\mu_L$ also takes a relatively high value, the lateral slipping of the wheels is reduced and the vehicle can be stopped with high safety. Accordingly, it has been demanded for such an anti-skid control device for use in vehicle braking apparatus as capable of controlling the braking force applied to the wheels such that the slip ratio S may take a preferred value as described above.

By the way, since it is generally difficult to directly detect the slip ratio S of a vehicle, for example, automobile during running, there have been proposed such anti-skid control devices as capable of satisfying the foregoing requirement by using measurable values concerned with the slip ratio S. In one of proposed anti-skid control devices using a simulated vehicle velocity, the vehicle velocity is forecasted by a predetermined simulated vehicle velocity after the start of the braking operation and the circumferential velocity of the wheels is controlled based on the simulated vehicle velocity so as to attain a preferred slip ratio.

However, in the anti-skid control device adapted to merely forecast the simulated vehicle velocity, thereby set an aimed circumferential velocity of wheels in view of the slip ratio, and control the supply of the braking forces to the wheels so as to conform the actual circumferential velocity of the wheels to the aimed circumferential velocity of the wheels, if a simulated vehicle velocity with a high deceleration is set for running on a road surface of a low friction coefficient, the circumferential velocity of the wheels is abruptly decreased to bring the wheels into a locked state and increase the braking distance and tend to cause lateral slip of the wheels, to result in an instable driving state. On the other hand, if a simulated vehicle velocity with a low deceleration is set for running on a road surface of a high friction coefficient, substantially non-braking state is conversely caused to increase the braking distance extremely.

In order to overcome the foregoing disadvantages, there has also been proposed such an anti-skid control device as measuring the extent of the time for moderating the braking force in the control for applying the braking force to the wheels, estimating that the vehicle runs on a road surface of a high friction coefficient if the moderating time is short and, while on the other hand, that the vehicle runs on a road surface of low friction coefficient if the moderating time is long, and increasing or decreasing the simulated vehicle velocity based on the thus estimated result. However, since the moderating time as described above is concerned with the friction coefficient, as well as varies also in connection with the inertia moment, braking moment, etc. of the wheels and the rotating parts related to the wheels, it is difficult to obtain a brake control with a friction coefficient near the maximum value only with the increase/decrease of the simulated vehicle velocity depending on the moderating time.

This invention has been achieved in view of the foregoing problems and it is an object thereof to provide an anti-skid control device capable of applying a braking force to a vehicle corresponding to the change of the friction coefficient between wheels and a road surface in contact therewith, thereby enabling to prevent the wheels effectively from locking and shorten the braking distance as much as possible.

According to this invention, the foregoing object can be attained by an anti-skid control device comprising a means for detecting the circumferential velocity of wheels, an electromagnetic valve means for controlling the hydraulic braking pressure for the wheels, and an electronic control circuit means for preparing an aimed circumferential velocity of wheels during a time of braking based on detected signals from the detecting means and controlling the electromagnetic valve means so as to bring the circumferential velocity of the wheels nearer to the aimed circumferential velocity of the wheels, the electronic control circuit means being adapted to determine a ratio of circumferential acceleration and deceleration of the wheels on every anti-skid controlling period for decreasing/increasing the circumferential velocity of the wheels, estimate the friction coefficient on a road surface from the ratio and control the valve means based on the estimated friction coefficient at the road surface.

These and other objects, features as well as advantageous effects of this invention will now be described more in detail referring to the preferred embodiment shown in the appended drawings, wherein FIG. 1 is a relationship between the slip ratio and the friction coefficient;

Figure 1:
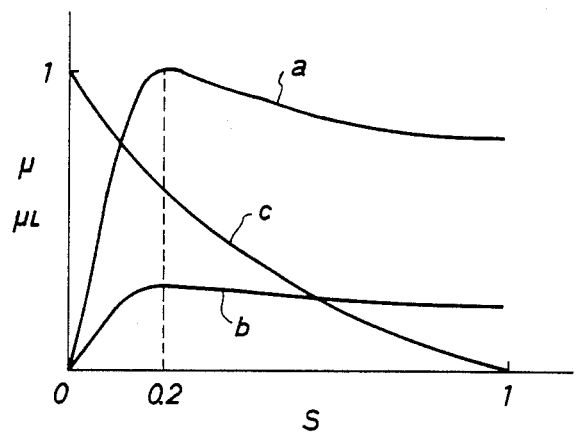
Figure 3:
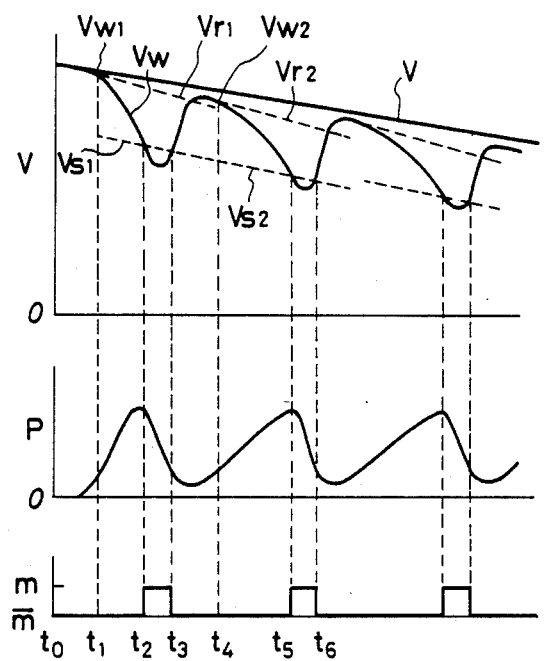
FIG. 3 is a timing diagram of a preferred embodiment shown in FIG. 2.
Figure 2:
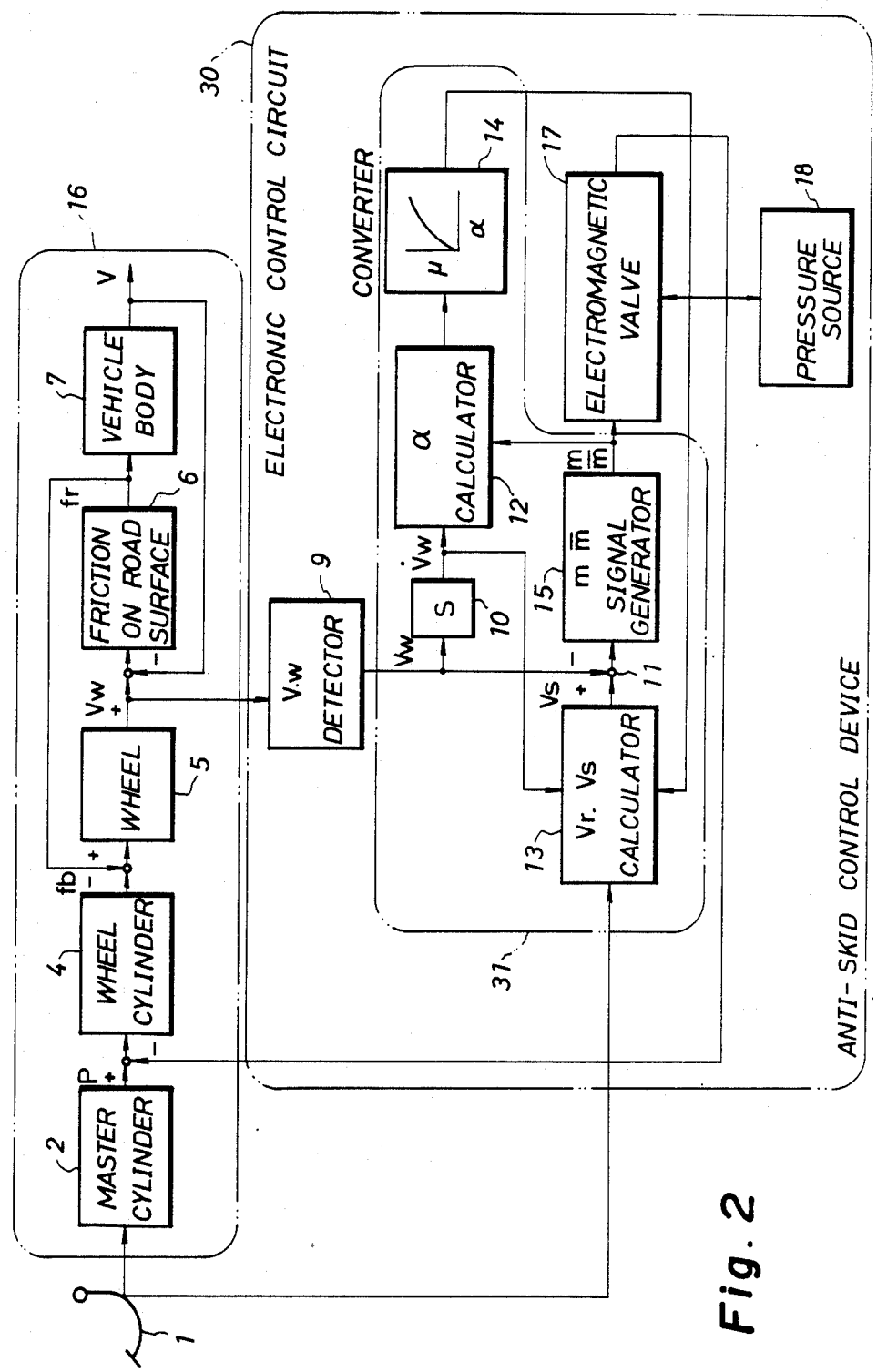
FIG. 2 is a block diagram for a preferred embodiment according to this invention.

In FIG. 2 and FIG. 3, the pressing force on a brake pedal 1 is transmitted to a master cylinder 2, which generates a hydraulic pressure in accordance with the pressing force and the hydraulic pressure is transmitted to a wheel cylinder 4.

The wheel cylinder 4 generates a braking force $f_b$ corresponding to the thus supplied hydraulic pressure P, and a wheel 5 of an automobile is braked due to the difference between the driving force $f_r$ from a road surface 6 based on the friction coefficient $\mu$ relative to the road surface 6 in contact with the wheel 5 and the braking force $f_b$, by which the circumferential velocity Vw of the wheel 5 is determined. The slip ratio S is determined due to the difference between the circumferential velocity Vw and the velocity V of a vehicle body 7, the friction coefficient $\mu$ between the wheel 5 and road surface 6 is determined depending on the slip ratio S and the velocity V of the vehicle body 7 is varied with the friction force applied from the road surface 6 to the wheel 5 based on the thus determined friction coefficient $\mu$. A detector 9 comprises for example, an electromagnetic or optical pulse generator, a counter, a coefficient (wheel diameter) multiplier, etc. for detecting the wheel circumferential velocity Vw from the rotating velocity of the wheel 5. The wheel circumferential velocity Vw obtained from the detector 9 is supplied to a differentiator 10 and a comparator 11. The differentiator 10 differentiates the wheel circumferential velocity Vw to supply a wheel acceleration/deceleration $\dot{V}w$ to an acceleration/deceleration ratio calculator 12 and an aimed wheel circumferential velocity calculator 13. The aimed wheel circumferential velocity calculator 13 calculates the aimed wheel circumferential velocity Vs from the simulated vehicle velocity Vr based on the friction coefficient $\mu$ supplied from a converter 14 and a previously determined optimal slip ratio Sr and delivers the velocity Vs to the comparator 11. The comparator 11 compares the actual wheel circumferential velocity Vw with the aimed wheel circumferential velocity Vs and delivers the result of the comparison to a moderating signal generator 15. Upon receiving the comparison result that the actual wheel circumferential velocity Vw is lower than the aimed wheel circumferential velocity Vs from the comparator 11, the generator 15 supplies a moderating signal m to the calculator 12 and the electromagnetic valve 17. On the other hand, when the result of comparison that the actual wheel circumferential velocity Vw is higher than the aimed wheel circumferential velocity Vs is received from the comparator 11, the generator 15 supplies a moderation release signal $\overline{m}$ to the calculator 12 and the electromagnetic valve 17. The calculator 12 stores the acceleration/deceleration $\dot{V}w$ from the differentiator 10 as the deceleration $\dot{V}wd$ i.e. the decreasing rate $\dot{V}wd$ of the wheel circumferential velocity Vw by the moderating signal m generated from the generator 15 at the time when the actual wheel circumferential velocity Vw goes lower than the aimed wheel circumferential velocity Vs. Then, at the time when the actual wheel circumferential velocity Vw goes higher than the aimed wheel circumferential velocity Vs, the calculator 12 reads the acceleration/deceleration $\dot{V}w$ from the differentiator 10 as the acceleration $\dot{V}wu$ i.e. the increasing rate $\dot{V}wu$ of the wheel circumferential velocity Vw by the moderation release signal $\overline{m}$ generated from the generator 15, as well as calculates the ratio $\alpha$ of the acceleration $\dot{V}wu$ to the previously stored deceleration $\dot{V}wd$, that is, $$\alpha = |\dot{V}wu/\dot{V}wd|$$

and supplies the thus obtained ratio $\alpha$ to the converter 14. In this case, the ratio $\alpha$ has a concern with the friction coefficient $\mu$ of the road surface 6 irrespective of the moment of inertia of the wheel 5. For example, the ratio $\alpha$ is increased if the friction coefficient $\mu$ is higher and, conversely, the ratio $\alpha$ is decreased if the friction coefficient $\mu$ is lower. The relationship between the ratio $\alpha$ and the friction coefficient $\mu$ can be determined from the equation of motion of a modelled rotating wheel system 16 at the time when braking is applied thereon and also from the experiment by an actual running of vehicle, which is shown as curve d in FIG. 4. The relationship between the ratio $\alpha$ and the friction coefficient shown by the curve d thus determined is previously set or stored to the converter 14 and, accordingly, the converter 14 supplies a friction coefficient $\mu$ corresponding to the supplied ratio $\alpha$ to the calculator 13.

The electromagnetic valve 17 that receives the moderating signal m and the moderation release signal $\overline{m}$ from the generator 15 is actuated such that, upon receiving the moderating m, the hydraulic pressure in the master cylinder 2 is released to the tank of a hydraulic pressure source 18 and, while upon receiving the moderation release signal $\overline{m}$, the hydraulic pressure from the hydraulic pressure source 18 is supplied to the wheel cylinder 4 to recover the hydraulic pressure P once moderated.

The operation of the anti-skid control device 30 constituted as described above is as follows. At first, $\dot{V}ro$ and Sro are previously set to the calculator 13 as the initial values for the deceleration $\dot{V}r$ for the simulated vehicle velocity Vr and the slip ratio Sr. As the initial values, values for the road surface of a high friction coefficient are set for the safety, for example, $\dot{V}ro = -1G$ (where G means gravitational acceleration) and Sro=0.25. In the vehicle body 7 running at the vehicle body velocity Vo, when the pressing force is applied on the pedal 1 to supply a hydraulic pressure from the master cylinder 2 to the wheel cylinder 4 at a time $t_0$, the calculator 13 starts the timer operation by the signal from a switch (not illustrated) for detecting the application of the pressing force onto the pedal 1 and compares the initial value $\dot{V}ro$ with the value $\dot{V}w$ from the differentiator 10. When the relationship $\dot{V}w < \dot{V}ro$ is detected at a time $t_1$, the calculator 13 starts to calculate the simulated vehicle velocity Vr and the aimed wheel circumferential velocity Vs while assuming that the wheel 5 starts slipping. That is, the calculator 13 executes the calculation:

$$Vs = (Vo + \dot{V}ro(t - T_0))(1 - Sro)$$

where t represents the time elapsed after the time $t_0$, $T_0$ represents the progress of time from the time $t_0$ to $t_1$, $\dot{V}ro$ corresponds to the wheel deceleration $\dot{V}w1$ at the time $t_1$ and $(Vo+\dot{V}ro(t-T_0))$ represents the initial simulated vehicle velocity Vr1. The calculator 13 supplies the result of the calculation as the first aimed wheel circumferential velocity Vs1 to the comparator 11. The comparator 11 compares the aimed wheel circumferential velocity Vs1 supplied with the wheel circumferential velocity Vw at present and supplies the result of the comparison to the signal generator 15. When the relation Vw<Vs1 is reached at the time $t_2$, the signal generator 15 delivers the moderating signal m to the calculator 12 and the electromagnetic valve 17 and, in turn, the electromagnetic valve 17 releases the hydraulic pressure from the master cylinder 2 to the tank of the hydraulic pressure source 18 to result in the decrease of the hydraulic pressure P supplied from the master cylinder 2 to the wheel cylinder 4. On the other hand, the calculator 12, upon receiving the moderating signal m, stores the value $\dot{V}w$ supplied from the differentiator 10 at the time, that is, at the time $t_2$ as the deceleration or the decreasing rate $\dot{V}wd$. The wheel circumferential velocity Vw does not increase simultaneously with the decreasing of the hydraulic pressure P supplied to the wheel cylinder 4 at the time $t_2$ due to the moment of inertia or the like of the wheel 5. Therefore, the velocity Vw increases after having decreased once subsequent to the time $t_2$. When the relationship Vw>Vs1 is reached at the time $t_3$, the signal generator 15 delivers the moderation rlease signal $\overline{m}$ to the calculator 12 and the electromagnetic valve 17 and the hydraulic pressure in turn, is supplied through the valve 17 from the hydraulic pressure source 18 to the wheel cylinder 4 to recover the hydraulic pressure P decreased previously. On the other hand, upon receiving the moderation release signal $\overline{m}$, the calculator 12 reads the value $\dot{V}w$ supplied from the differentiator 10 at that time, that is, at the time $t_3$ as the acceleration or the increasing rate $\dot{V}wu$ and, simultaneously, calculates the ratio $\alpha$ from the decreasing rate $\dot{V}wd$ stored at the time $t_2$ and the increasing rate $\dot{V}wu$ as described above and supplies the result of the calculation to the converter 14. The converter 14 determines a friction coefficient $\mu$ corresponding to the ratio $\alpha$ based on the ratio $\alpha$ thus supplied and supplies the friction coefficient $\mu$ to the calculator 13. In other words, the converter 14 converts the value of ratio $\alpha$ into the value of the friction coefficient $\mu$ based on the converting table shown in FIG. 4 which is stored in the converter 14. The calculator 13 corrects the simulated wheel circumferential deceleration $\dot{V}r$ from $\dot{V}ro$ to $-\mu G$ (G: gravitational acceleration) by the friction coefficient $\mu$ thus supplied and compares the thus corrected value $\dot{V}r2=-\mu G$ with the value Vw issued from the differentiator 10. When the relationsnip Vw<$\dot{V}r2$ is detected at the time $t_4$, the calculator 13 regards that the wheel 5 starts slipping again and begins to execute the calculation newly for the simulated vehicle velocity Vr2 and the aimed wheel circumferential velocity Vs2. That is, the calculator 13 executes the calculation:

$$Vs=(Vo+\dot{V}r2(t-T_0))(1-Sro)$$

in the same manner as described above and delivers the result of the calculation as a new aimed wheel circumferential velocity Vs2 to the comparator 11. The succeeding procedures are the same as described above and, when the relationship Vw<Vs2 is reached at the time $t_5$, the generator 15 delivers the moderating signal m to order the moderating operation for braking. Then, if the relationship Vw>Vs2 is reached at that time $t_6$, the generator 15 delivers the moderation release signal $\overline{m}$ to release the moderating operation. The foregoing operations are repeated successively hereinafter.

Figure 5:
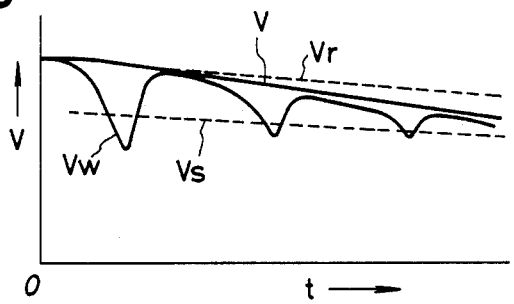
FIGS. 5 and 6 are timing diagrams for explaining operation of the embodiment shown in FIG. 2.
Figure 6:
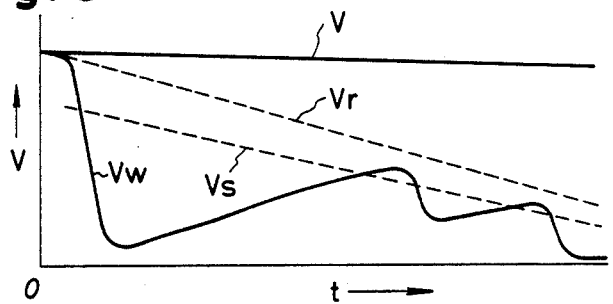

By the way, in the braking device 30 constituted as has been described above, since the friction coefficient $\mu$ is estimated by the determination of the ratio $\alpha$ and the simulated vehicle velocity Vr and the aimed wheel circumferential velocity Vs are corrected thereby, an anti-skid control substantially corresponding to the change in the friction coefficient $\mu$ can be carried out. Namely, in the case of applying braking at a road surface of a high friction coefficient $\mu$, since the wheel is generally less slipping, the wheel circumferential velocity Vw is slowly lowered during a time of braking, while velocity Vw rapidly increases during a time of releasing the braking, that is, moderating operation, for example, as shown in FIG. 5. On the other hand, in the case of applying braking at a road surface of a low friction coefficient $\mu$, since the wheel is generally liable to slip, the wheel circumferential velocity Vw rapidly decreases during a time of braking, while velocity Vw slowly increases during a time of releasing the braking, for example, as shown in FIG. 6. Accordingly, in a conventional control device in which a fixed simulated vehicle velocity Vr and an aimed wheel circumferential velocity Vs are used, if a simulated vehicle velocity Vr with a high deceleration is set irrespective of a road surface of a low friction coefficient $\mu$, for instance, the wheel circumferential velocity Vw abruptly decreases to instantly bring about a locked state as shown in FIG. 6 to increase the braking distance and tend to cause lateral slipping thereby resulting in an instable driving operation. On the other hand, if a simulated vehicle velocity Vr with a low deceleration is set irrepective of a road surface of a high friction coefficient, a substantially non-braking state results as shown in FIG. 5, by which the braking distance is remarkably extended. On the other hand, in the control device according to this invention, since the friction coefficient $\mu$ is determined from the ratio $\alpha$ and the simulated vehicle velocity is corrected with the friction coefficient $\mu$, an appropriate braking can be carried out corresponding to the change in the friction coefficient $\mu$. In addition, since the substantial moment of inertia Iw of the wheel is increased several times as large as only that of the wheels depending on the shifting position of a transmission gear, for example, top, third or second velocity position upon braking, the change in the wheel circumferential velocity during braking operation results depending on the value for the moment of inertia Iw. Since the ratio $\alpha$ is greater if the friction coefficient is high and smaller if it is low irrespective of the extent of the moment of inertia Iw of the wheels, preferred braking characteristics can also be obtained by the control device according to this invention for the increase or decrease of the substantial moment of inertia of the wheel.

Figure 4:
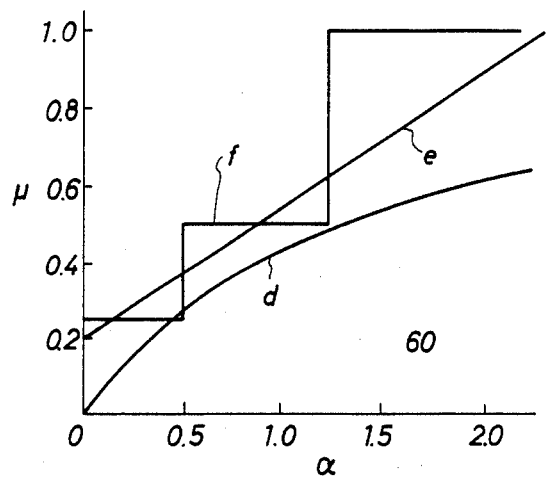
FIG. 4 is a relationship between the ratio $\alpha$ and the friction coefficient $\mu$.
Figure 7:
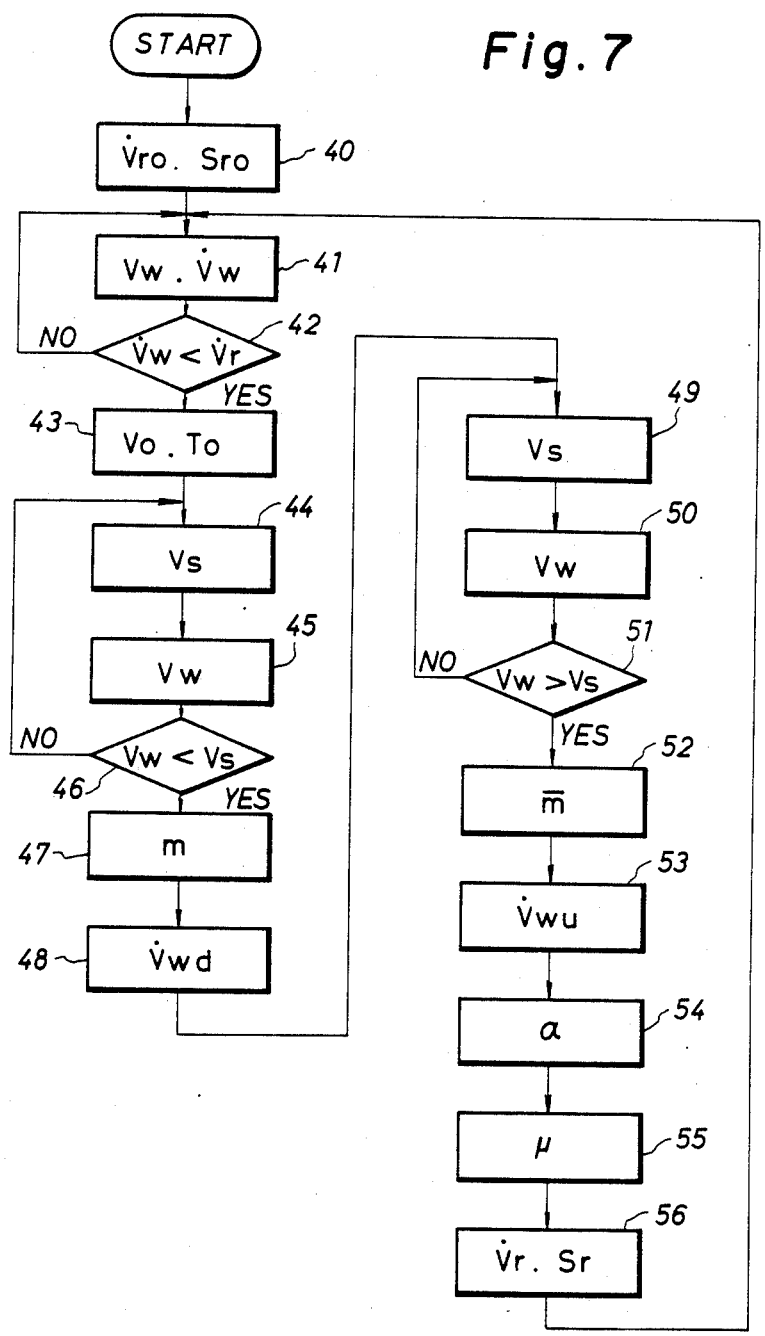
FIG. 7 is a flow chart of the program in the case of using a microcomputer instead of the embodiment shown in FIG. 2.

Although the electronic control circuit 31 is constituted with the differentiator 10, comparator 11, calculator 12, calculator 13, converter 14 and generator 15 in the embodiment described above, it may alternatively be possible to constitute the electronic control circuit 31 with a microcomputer or the like and the same operation as described above can be obtained by operating the microcomputer on a program comprising steps as shown in FIG. 7. The program is started by a signal from a switch actuated by the pressing of pedal 1, sets the initial values $\dot{V}ro$ and $Sro$ for the simulated vehicle deceleration $\dot{V}r$ and the slip ratio S at the step 40, calculates the wheel circumferential velocity Vw and the wheel circumferential acceleration/deceleration $\dot{V}w$ by the signal from the detector 9 at the step 41, decides whether the wheel acceleration/deceleration $\dot{V}w$ is greater than the initial value $\dot{V}ro$ or not at the step 42, in which the program returns to the step 41 if it is not less than the initial value $\dot{V}ro$ or proceeds to the step 43 if it is less than the initial value $\dot{V}ro$. The program sets, at the step 43, the wheel circumferential velocity Vo at the time of transition from the step 42 to the step 43 and the time $T_0$ from the starting step to the step 43. The program calculates the above-described aimed value:

$$Vs = (Vo + \dot{V}ro(t - T_0))(1 - Sro)$$

at the step 44, reads in the present wheel circumferential velocity Vw at the step 45, decides whether the wheel circumferential velocity Vw thus read has been lowered or not as compared with the aimed wheel circumferential velocity Vs and returns to the step 44 if it is not lower than the aimed wheel circumferential velocity Vs or delivers the moderating signal m if it is lowered at the step 47 and calculates the wheel acceleration/deceleration $\dot{V}w$ at that time and stores the value as the decreasing rate $\dot{V}wd$ at the step 48. The program then calculates the aimed wheel circumferential velocity Vs again at that time at the step 49, reads in the wheel circumferential velocity Vw at that time at the step 50, decides at the step 51 whether the wheel circumferential velocity Vw having been read in at the step 50 is increased or not as compared with aimed wheel circumferential velocity Vs calculated in the step 49 and returns to the step 49 if it is not increased and delivers the moderation release signal $\overline{m}$ if it is increased at the step 52, calculates the wheel acceleration/deceleration $\dot{V}w$ at the time beginning to deliver the moderation release signal $\overline{m}$ in order to obtain the increasing rate $\dot{V}wu$ at the step 53, calculates the ratio $\alpha$ from the decreasing rate $\dot{V}wd$ having been stored in the step 48 and the increasing rate $\dot{V}wu$ obtained in the step 53 at the step 54 and determines a friction coefficient $\mu$ corresponding to the ratio $\alpha$ from the thus calculated ratio $\alpha$ at the step 55. Upon determining the friction coefficient $\mu$, the curve d shown in FIG. 4 is previously stored as a converting table in a memory device. At the step 56, the simulated vehicle acceleration/deceleration $\dot{V}r$ is corrected into $-\mu G$ by the friction coefficient $\mu$ obtained in the step 55 and, thereafter, the program returns to the step 41 and then repeats the foregoing steps.

Although the slip ratio S has been fixed in the above-described embodiment, this invention is no way limited only thereto but the slip ratio Sr may be corrected together with the correction for the simulated vehicle acceleration/deceleration Vr in order to avoid the phenomenon tending to cause locking at a road surface of a low friction coefficient and a phenomenon tending to result in insufficient braking caused at a road surface of a high friction coefficient. In this case, as one example of corrected set values for the simulated vehicle acceleration/deceleration Vr and the slip ratio Sr relative to the friction coefficient $\mu$, those values can be experimentally obtained, for example, for one group of the slip ratio Sr; such as the slip ratio Sr=0.3-0.4 for a high friction coefficient, that is, if the friction coefficient is greater than 0.6, the slip ratio Sr=0.2-0.3 for a medium friction coefficient, that is, if the friction coefficient is between 0.35 and 0.6, and the slip ratio Sr=0.1-0.2 for a low friction coefficient, that is, if the friction coefficient is less than 0.35 and for the other group of the slip ratio Sr: such as the slip ratio Sr=0.1-0.3 for the high friction coefficient, the slip ratio Sr=0.1-0.2 for the medium friction coefficient and the slip ratio Sr=0.05-0.1

Further, although the curve d is used in the foregoing embodiment in the case of determining the friction coefficient $\mu$ corresponding to a ratio $\alpha$ from this ratio $\alpha$, a conversion characteristic approximate to a straight or step-wise broken line above the curve d as shown by the curve e or f may be used for the safety, because the friction coefficient $\mu$ is estimated smaller in the region 60 below the curve d, where the braking operation is too weak and results in a non-braking state. Furthermore, although the description has been made in the foregoing embodiment with respect to a mono-wheel system, this invention is no way limited only thereto but the foregoing braking may be applied to each of four wheels of an automobile. In addition, the braking may also be applied to the right and left front wheels respectively and the right and left rear wheels respectively. In addition, the braking may also be applied to a dual-system in which pipe lines for front and rear wheel brakes are disposed in an X-like configuration.

As has been described above according to this invention, since the electronic control circuit is adapted to determine circumferential acceleration/deceleration ratio of the wheel on every anti-skid controlling period of decreasing and increasing wheel circumferential velocity, estimate the friction coefficient on the road surface from the acceleration/deceleration ratio and control the electromagnetic valve for controlling the hydraulic braking pressure of the wheel based on the estimated friction coefficient on the road surface, an extremely desirable anti-skid control can be carried out even to a remarkable change in the friction coefficient $\mu$ to shorten the braking distance and apply braking while desirably maintaining the stability for the driving operation.

What is claimed is:

1. An anti-skid control device comprising means for detecting a wheel circumferential velocity, an electromagnetic valve means for controlling a hydraulic braking pressure for a wheel, and an electronic control circuit means for preparing an aimed wheel circumferential velocity based on a detection signal from said detecting means during a time of braking and controlling said electromagnetic valve means so as to bring the wheel circumferential velocity closer to said aimed wheel circumferential velocity, said circuit means further being adapted to determine a ratio of circumferential acceleration and deceleration of the wheel on every anti-skid controlling period for decreasing/increasing the wheel circumferential velocity, estimate a friction coefficient on a road surface from the ratio and control said electromagnetic valve means based on the thus estimated friction coefficient on the road surface.

2. The anti-skid control device according to claim 1, wherein said circuit means is adapted to adaptationally correct said aimed wheel circumferential velocity from said estimated friction coefficient on the road surface to thereby control the electromagnetic valve means.

3. The anti-skid control device according to claim 2, wherein said circuit means is adapted to correct a simulated wheel circumferential deceleration by said estimated friction coefficient on the road surface to thereby adaptationally correct said aimed wheel circumferential velocity.

4. The anti-skid control device according to claim 2, wherein said circuit means is adapted to correct the simulated wheel circumferential deceleration and the slip ratio by said estimated friction coefficient on the road surface to thereby adaptationally correct said aimed wheel circumferential velocity.

* * * * *